US010240572B2

United States Patent
Kamei et al.

(10) Patent No.: US 10,240,572 B2
(45) Date of Patent: Mar. 26, 2019

(54) ENGINE STARTING APPARATUS (71) Applicant: Mitsubishi Electric Corporation, Tokyo (JP)

(72) Inventors: Koichiro Kamei, Tokyo (JP); Daisuke Mizuno, Tokyo (JP); Hiroaki Kitano, Tokyo (JP); Naohito Kaneda, Tokyo (JP); Kazuhiro Odahara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 64 days.

(21) Appl. No.: 15/513,610

(22) PCT Filed: Nov. 5, 2014

(86) PCT No.: PCT/JP2014/079318
§ 371 (c)(1),
(2) Date: Mar. 23, 2017

(87) PCT Pub. No.: WO2016/071968
PCT Pub. Date: May 12, 2016

(65) Prior Publication Data
US 2018/0230957 A1 Aug. 16, 2018

(51) Int. Cl.
F02N 11/08 (2006.01)
F02D 29/02 (2006.01)
(Continued)

(52) U.S. Cl.
CPC .......... F02N 11/0844 (2013.01); F02D 29/02 (2013.01); F02N 11/0851 (2013.01);
(Continued)

(58) Field of Classification Search
CPC ............ F02N 11/0844; F02N 11/0851; F02N 15/067; F02N 2200/021; F02N 2200/022; F02N 2250/04
See application file for complete search history.

(56) References Cited

U.S. PATENT DOCUMENTS

2011/0137544 A1* 6/2011 Kawazu .............. F02N 11/0855
701/113
2011/0178695 A1* 7/2011 Okumoto ............ F02N 11/0844
701/103
(Continued)

FOREIGN PATENT DOCUMENTS

EP 2 913 516 A1 9/2015
JP 5442042 B2 3/2014
(Continued)

OTHER PUBLICATIONS

International Search Report for application No. PCT/JP2014/079318 dated Feb. 10, 2015.

Primary Examiner — Joseph Dallo
(74) Attorney, Agent, or Firm — Sughrue Mion, PLLC; Richard C. Turner (57) ABSTRACT The rotation speed and the crank position of an engine in an engine stopping process are detected; then, in the case where when the detected crank position is at an intermediate point between the top dead center of any one of the cylinders and the top dead center of the cylinder following said one of the cylinders, it is determined that the engine rotation speed is within a predetermined range, drive of the starter is prohibited for a predetermined time period.

4 Claims, 6 Drawing Sheets (51) Int. Cl.
 *F02N 15/06* (2006.01)
 *F02N 15/04* (2006.01)
(52) U.S. Cl.
 CPC ............ *F02N 15/067* (2013.01); *F02N 15/04* (2013.01); *F02N 2200/021* (2013.01); *F02N 2200/022* (2013.01); *F02N 2250/04* (2013.01); *Y02T 10/48* (2013.01)

(56) References Cited

U.S. PATENT DOCUMENTS

| | | |
|---|---|---|
| 2013/0180490 A1 | 7/2013 | Odahara et al. |
| 2013/0213351 A1* | 8/2013 | Kitsukawa ............... F02B 37/10 123/333 |
| 2014/0107903 A1 | 4/2014 | Kawazu et al. |
| 2014/0130635 A1* | 5/2014 | Kees .................... F02N 11/006 74/7 R |
| 2014/0345556 A1* | 11/2014 | Okabe ................. F02N 11/0844 123/179.16 |

FOREIGN PATENT DOCUMENTS

| | | |
|---|---|---|
| JP | 2014-77399 A | 5/2014 |
| WO | 2014/054471 A1 | 4/2014 |

\* cited by examiner

ENGINE STARTING APPARATUS

CROSS REFERENCE TO RELATED APPLICATIONS

This application is a National Stage of International Application No. PCT/JP2014/079318, filed on Nov. 5, 2014, the contents of all of which are incorporated herein by reference in their entirety

TECHNICAL FIELD

The present invention relates to an engine starting apparatus to be utilized in an idling stop system that automatically stops an engine when a predetermined idling stop condition is established and then restarts the engine when a restart condition is established.

BACKGROUND ART

To date, there has been known an idling stop system that automatically stops an engine in order to reduce the fuel cost of the automobile when a predetermined condition is established. Furthermore, there has been proposed an engine starting apparatus in which even when the ring gear coupled with the crankshaft of the engine is being rotating, the pinion gear coupled with the output axle of the starter motor is engaged with the ring gear so that in the case where immediately after the engine combustion is stopped by the idling stop system, an engine restart demand is issued when the engine is in an inertial rotation, the engine is restarted as quickly as possible.

With regard to these conventional engine starting apparatuses, there has been proposed a technology in which in order to make the rotating ring gear and the pinion gear engage with each other, the rotation speed of the engine in an inertial rotation is detected, the timing is set in such a way that the rotation speed of the ring gear at a time when the pinion gear abuts against the ring gear falls within a predetermined range, and at the timing when the rotation speed of the ring gear falls within the predetermined range, the pinion gear is engaged with the ring gear so that the engine is restarted. Moreover, when an engine rotates backward, the engagement between the pinion gear and the ring gear causes large impact, and hence excessive engagement noise and the abrasion in the pinion gear and the ring gear are caused; thus, there has been proposed a technology in which under a predetermined condition, the operation of making the pinion gear engage with the ring gear is prohibited.

That is to say, International Publication No. WO 2014-054471 (Patent Document 1) discloses an engine starting apparatus that controls restarting of an engine, based on the output of a rotation sensor that detects the rotation speed of the engine, while regarding the section where the engine rotates at a predetermined negative rotation speed or lower as a starter drive prohibition section.

Japanese Patent Publication No. 5442042 (Patent Document 2) discloses an engine starting apparatus that estimates, in an engine stopping process, whether or not the engine rotates backward before the next predetermined crank position is reached, based on the rotation speed of the engine at a specific predetermined crank position, for example, at the top dead center (TDC) of a cylinder, that specifies, after the estimation of backward rotation, the interval from the timing of starter drive prohibition to the timing of cancellation of starter drive prohibition as a prohibition range and specifies the interval out of the specified prohibition range as a permission range, and that prohibits restarting of the engine in the foregoing specified prohibition range and restarts the engine in the foregoing specified permission range, when the restarting condition is established in an engine stopping process.

Moreover, Japanese Patent Application Laid-Open No. 2014-77399 (Patent Document 3) discloses an engine starting apparatus that includes a first estimation means for estimating a forward engine rotation speed at a time when the rotation speed is decreasing and a second estimation means for estimating a backward engine rotation speed, and that estimates the engine rotation speed in a rotation speed decreasing time, while performing switching between the first estimation means and the second estimation means in accordance with whether the engine output axle is rotating forward or backward.

PRIOR ART REFERENCE

Patent Document

[Patent Document 1] International Publication No. WO 2014/054471

[Patent Document 2] Japanese Patent Publication No. 5442042

[Patent Document 3] Japanese Patent Application Laid-Open No. 2014-77399

DISCLOSURE OF THE INVENTION

Problems to be Solved by the Invention

In the foregoing conventional engine starting apparatus, the engine rotation speed is detected based on a pulse signal outputted from a crank angle signal generation means. However, the crank angle signal generation means includes a magnetic disc that is coupled with the crankshaft of the engine and on the outer circumference of which teeth are formed in such a way as to be spaced a predetermined gap apart from one another and an electromagnetic pickup that is electromagnetically coupled with the teeth of the magnetic disc and generates the pulse signal; thus, because in the low rotation speed region of the engine (e.g., 50 [rpm] or lower), the period of the pulse becomes long, the engine rotation speed cannot accurately be detected.

Accordingly, with the crank angle signal generation means formed in such a way as described above, there cannot accurately be detected an engine rotation speed that is a rotation speed at a time immediately before in the engine stopping process, the engine rotates backward and is approximately "0". Therefore, the backward rotation of the engine is determined by use of the estimation means; however, there has been a problem that because the behavior of the engine is complicated, accurate estimation of the backward rotation of the engine requires a complicated calculation and hence the load on the engine control unit becomes large.

The present invention has been implemented in order to solve the foregoing problems; the objective thereof is to provide an engine starting apparatus that does not perform the estimation, of the backward rotation of the engine, that is accompanied by a complicated calculation, and that can securely prevent, through simple control, the pinion gear and the ring gear from engaging with each other in a region where the backward rotation speed of the engine is large.

Means for Solving the Problems

An engine starting apparatus according to the present invention is provided with an idling stop system for automatically stopping combustion in an engine with a plurality of cylinders so as to stop the engine, when a predetermined condition is established, and restarts the engine by driving a starter so as to make a pinion gear provided in the starter engage with a ring gear of the engine in an inertial rotation, in the case where when combustion of the engine is stopped by the idling stop system and hence the engine is in the inertial rotation, a restart demand for the engine is issued. The engine starting apparatus is characterized in that an engine rotation speed and a crank angle position at a time when the engine is in the inertial rotation are detected and in that in the case where when the detected crank angle position is at an intermediate point between the top dead center of any one of the cylinders of the engine in the inertial rotation and the top dead center of the cylinder following said one of the cylinders, it is determined that the detected engine rotation speed is within a predetermined range, drive of the starter is prohibited for a predetermined time period.

An engine starting apparatus according to the present invention is provided with an idling stop system for automatically stopping combustion in an engine with a plurality of cylinders so as to stop the engine, when a predetermined condition is established, and restarts the engine by driving a starter so as to make a pinion gear provided in the starter engage with a ring gear of the engine in an inertial rotation, in the case where when combustion of the engine is stopped by the idling stop system and hence the engine is in the inertial rotation, a restart demand for the engine is issued. The engine starting apparatus is characterized in that an engine rotation speed and a crank angle position at a time when the engine is in the inertial rotation are detected, in that there are provided a first predetermined time period and a second predetermined time period that each start in the case where when the detected crank angle position is at an intermediate point between the top dead center of any one of the cylinders of the engine in the inertial rotation and the top dead center of the cylinder following said one of the cylinders, it is determined that the detected engine rotation speed is within a predetermined range, in that each of the first predetermined time period and the second predetermined time period is determined based on the engine rotation speed at the time point when the determination is performed, in that the second predetermined time period is set to be longer than the first predetermined time period, and in that drive of the starter is prohibited for a time period from a time point when the first predetermined time period ends to a time point when the second predetermined time period ends.

Advantage of the Invention

In an engine starting apparatus according to the present invention, in the case where when the detected crank angle position is at an intermediate point between the top dead center of any one of the cylinders of the engine in the inertial rotation and the top dead center of the cylinder following said one of the cylinders, it is determined that the detected engine rotation speed is within a predetermined range, drive of the starter is prohibited for a predetermined time period; therefore, there can be obtained an engine starting apparatus that can securely prevent the pinion gear and the ring gear from engaging with each other in a region where the backward rotation speed is so large that excessive engagement noise and abrasion in the gears are caused.

In an engine starting apparatus according to the present invention, there are provided a first predetermined time period and a second predetermined time period that each start in the case where when the detected crank angle position is at an intermediate point between the top dead center of any one of the cylinders of the engine in the inertial rotation and the top dead center of the cylinder following said one of the cylinders, it is determined that the detected engine rotation speed is within a predetermined range; each of the first predetermined time period and the second predetermined time period is determined based on the engine rotation speed at the time point when the determination is performed; the second predetermined time period is set to be longer than the first predetermined time period; drive of the starter is prohibited for a time period from a time point when the first predetermined time period ends to a time point when the second predetermined time period ends. Therefore, the pinion gear and the ring gear can securely be prevented from engaging with each other in a region where the backward rotation speed is so large that excessive engagement noise and abrasion in the gears are caused, and because the time during which drive of the starter is prohibited is shortened, the feeling of being sluggish, caused by restarting, can be suppressed.

BEST MODE FOR CARRYING OUT THE INVENTION

Embodiment 1

Figure 1:
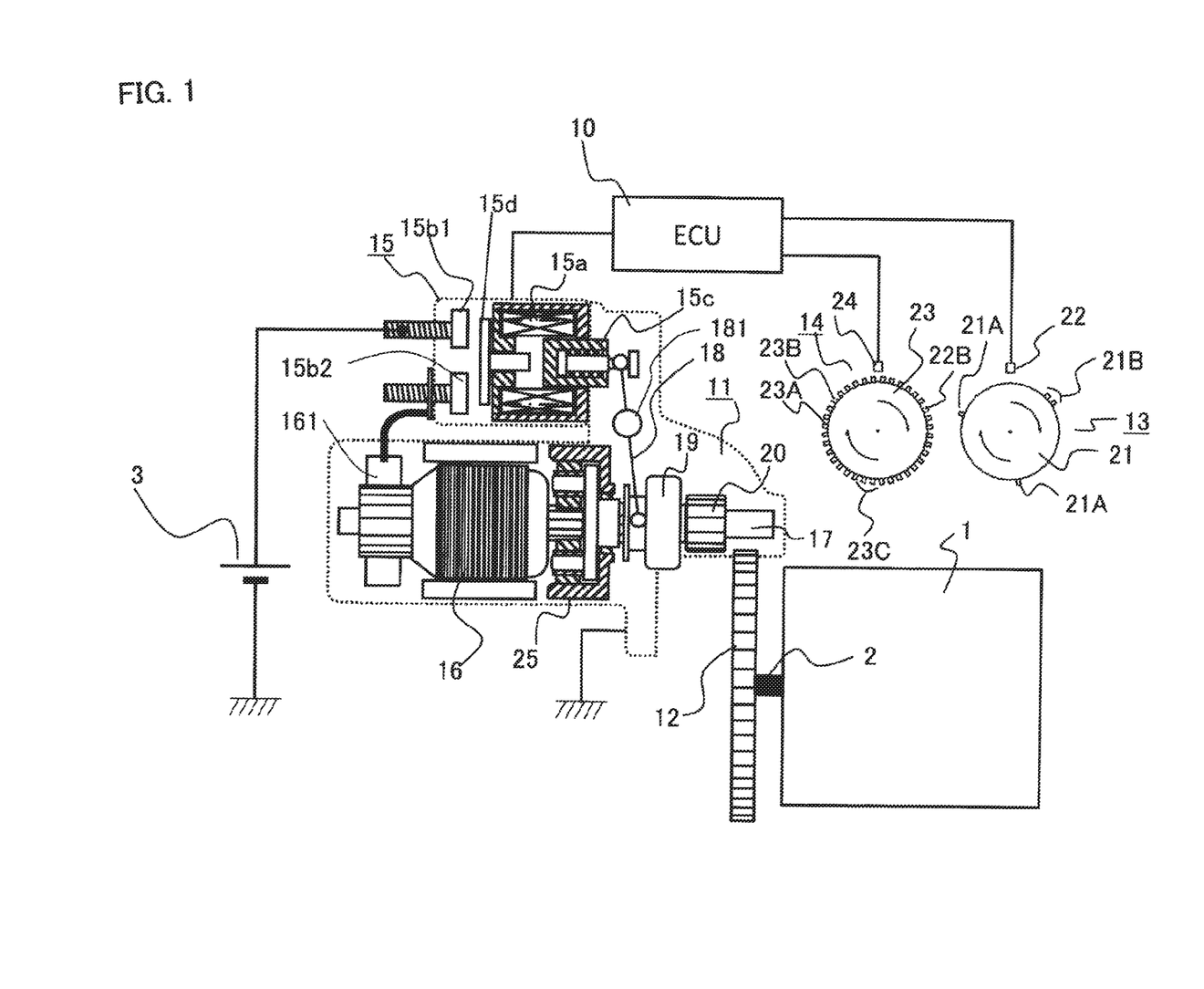
FIG. 1 is a configuration diagram of an engine starting apparatus according to Embodiment 1 of the present invention.

FIG. 1 is a configuration diagram of an engine starting apparatus according to Embodiment 1 of the present invention. In FIG. 1, an engine starting apparatus according to Embodiment 1 of the present invention includes an engine control unit (hereinafter, referred to as an ECU) 10, a starter 11, an electromagnetic switch 15, a ring gear 12 coupled with a crankshaft 2 of an engine 1, a cam angle signal generation unit 13 that generates a cam angle signal corresponding to the rotation angle of a camshaft for opening and closing an intake valve and an exhaust valve of the engine 1, and a crank angle signal generation unit 14 that generates a crank angle signal corresponding to the rotation angle of the crankshaft 2 of the engine 1 and the rotation speed of the engine 1.

The starter 11 includes a motor 16, a speed reducing mechanism 25 that decelerates the rotation speed of the output axle of the motor 16, a starter output axle 17, a lever 18, a one-way clutch 19 inserted between the starter output axle 17 and the speed reducing mechanism 25, and a pinion gear 20 spline-coupled with the starter output axle 17.

The electromagnetic switch 15 includes a coil 15a, a plunger 15c that is attracted into the inner space of the coil 15a when the coil 15a is energized, a movable contact 15d that is pushed out to the left side of the drawing by the plunger 15c when the plunger 15c is attracted into the inner space of the coil 15a, and a pair of fixed contacts 15b1 and 15b2 that are short-circuited by the pushed-out movable contact 15d that has been pushed out by the plunger 15c. When the fixed contacts 15b1 and 15b2 in a pair are short-circuited by the movable contact 15d, a battery 3 supplies an armature current to the armature coil of the motor 16, by way of the fixed contact 15b1, the movable contact 15d, the fixed contact 15b2, and a brush 161 of the motor 16, in that order.

One end of the lever 18 is engaged with the plunger 15c of the electromagnetic switch 15; the other end thereof is engaged with the one-way clutch 19; a supporting portion 181 provided between the one end and the other end thereof is pivotably supported by the case (unillustrated) of the starter 11.

ECU 10 controls energization of the electromagnetic switch 15. When the coil 15a of the electromagnetic switch 15 is energized based on the control by ECU 10, the plunger 15c is attracted into the inner space of the coil 15a. In this situation, the lever 18 whose one end is engaged with the plunger 15c pivots on the supporting portion 181 counterclockwise in the drawing; the other end thereof, along with the one-way clutch 19, presses the pinion gear 20 to the right side of the drawing, so that the pinion gear 20 and the ring gear 12 are engaged with each other.

When the plunger 15c is attracted by the coil 15a, the pair of fixed contacts 15b1 and 15b2 in the electromagnetic switch 15 are short-circuited by the movable contact 15d, as described above; then, the battery 3 energizes the armature coil of the motor 16, so that the motor 16 rotates. The torque of the motor 16 is transferred to the starter output axle 17 by way of the speed reducing mechanism 25 and the one-way clutch 19, in that order, and is further transferred to the engine 1 by way of the pinion gear 20 spline-coupled with the starter output axle 17 and the ring gear 12, in that order.

The one-way clutch 19 transfers the torque, inputted from the motor 16 by way of the speed reducing mechanism 25, to the engine 1 through the pinion gear 20 and the ring gear 12, in that order; however, in the case where the torque of the engine 1 is inputted thereto by way of the ring gear 12 and the pinion gear 20, in that order, the one-way clutch 19 runs out of gear, so that the torque of the engine 1 is not transferred to the motor 16.

The engine 1 includes the crankshaft 2 that converts the reciprocal motion of a piston into a rotary motion, the camshaft (unillustrated) on which there is provided a cam for opening and closing the intake valve (unillustrated) and the exhaust valve provided in a combustion chamber, a transfer member (unillustrated) that transfers the rotation of the crankshaft 2 to the camshaft, an injector (unillustrated) for supplying fuel, an ignition plug (unillustrated), and the like. The angular velocity of the camshaft is decelerated through a transfer means to the half of the angular velocity of the crankshaft 2; the camshaft rotates in synchronization with the crankshaft 2.

The crank angle signal generation unit 14 includes a first rotating body 23, in the shape of a gear, that rotates in synchronization with the crankshaft 2 and at an angular velocity the same as that of the crankshaft 2 and a first pickup 24 that faces, through a gap, the outer circumference of the first rotating body 23. The first rotating body 23 is formed of a magnetic material; in the first rotating body 23, there are provided a plurality of tooth portions 23A arranged over the almost whole outer circumference thereof, two first missing tooth portions 23B, in each of which one tooth portion is missing, and one second missing tooth portions 23C, in which two tooth portions are missing. The first pickup 24 formed of an electromagnetic pickup or the like outputs a pulse train signal in which rectangular-wave-shaped pulses lie in a line, each time the first rotating body 23 rotates and hence each of the tooth portions 23A approaches the first pickup 24. The pulse train signal, inputted from the first pickup 24 to ECU 10 at a time when the first rotating body 23 rotates, forms a crank angle signal corresponding to the plurality of tooth portions 23A, the first missing tooth portions 23B, and the second missing tooth portion 23C of the first rotating body 23.

The first missing tooth portions 23B and the second missing tooth portion 23C provided on the outer circumference of the first rotating body 23 are arranged in such a way as to correspond to the reference angle positions of the crankshaft 2; the portions, of the crank angle signal outputted from the first pickup 24, that correspond to the first missing tooth portions 23B and the second missing tooth portion 23C are equivalent to information pieces indicating the reference angle positions of the crankshaft 2. In the engine starting apparatus according to Embodiment 1 of the present invention, the outer circumference of the first rotating body 23 is divided into 36 portions, and there are provided 32 tooth portions 23A, two first missing tooth portions 23B, in each of which one tooth portion is missing, and the second missing tooth portion 23C, in which two tooth portions are missing.

Accordingly, in the region where the tooth portions 23A are spaced evenly apart from one another, an On signal or an Off signal is outputted every predetermined rotation angle (e.g., every 10°; hereinafter, this angle will be referred to as a reference step angle); in contrast, in each of the first missing tooth portions 23B, the time during which the On signal or the Off signal is outputted is a time that is equivalent to two reference step angles, and in the second missing tooth portion 23C, the time during which the On signal or the Off signal is outputted is a time that is equivalent to three reference step angles.

The number of the On signals or the Off signals, outputted between each of two first missing tooth portions 23B and one second missing tooth portion 23C while the first rotating body 23 rotates once, is known. Thus, ECU 10 counts the crank angle signals from the first pickup 24 when the state of the crank angle signal changes from Off to On or when the state of the crank angle signal changes from On to Off; concurrently, ECU 10 can calculate the period of the crank angle signal, i.e., the period of the angle position, of the crankshaft, that is specified by two first missing tooth portions 23B and one second missing tooth portion 23C, based on the interval (equivalent to the spacing between the pulses) between the timings of the crank angle signal. It is clear that the positions of the missing tooth portions, the number thereof, and the like in the crank angle signal generation unit 14 are just examples and that the configuration of the crank angle signal generation unit 14 differs from the foregoing configuration, in accordance with the configuration of the engine.

Moreover, ECU 10 can determine the rotation speed of the engine 1, based on the crank angle signal. In other words, the engine rotation speed between the crank angle signals is calculated based on the changing rate of the period of the crank angle signal, so that the engine rotation speed can more accurately be obtained.

It may be allowed that ECU 10 obtains the engine rotation speed by performing switching, based on the angle position of the crank, between the case where the engine rotation speed is calculated from the interval equivalent to the spacing between the pulses of the crank angle signal and the case where the engine rotation speed between the crank angle signals is calculated based on the changing rate of the period of the rank angle signal. As a result, it is made possible to reduce the calculation error in the rotation speed in the vicinity of the inflection point of the engine rotation speed.

In the engine starting apparatus according to Embodiment 1 of the present invention, the timing when fuel is injected into the engine 1 is determined by utilizing, as the reference, the top dead center of the piston at the timing when the compression stroke is followed by the combustion stroke. In a four-cycle engine, each of the intake stroke, the compression stroke, the combustion stroke, and the exhaust stroke is repeated in that order every 180° (the angle of the crank position). Accordingly, with only the angle position of the crank, it cannot be determined whether the piston of each of the cylinders is in the compression stroke or in the exhaust stroke.

Therefore, ECU 10 utilizes the cam angle signal from the cam angle signal generation unit 13 in order to discriminate among the cylinders. The cam angle signal generation unit 13 includes a second rotating body 21, in the shape of a gear, that rotates in synchronization with the rotation of the camshaft and at an angular velocity the same as that of the camshaft and a second pickup 22, formed of an electromagnetic pickup or the like, that faces, through a gap, the outer circumference of the second rotating body 21. The second rotating body 21 is formed of a magnetic material; on the outer circumference thereof, there are provided two first tooth portions 21A, each of which has one tooth portion, and one second tooth portion 21B having two tooth portions.

The second pickup 22 outputs a pulse train signal in which rectangular-wave-shaped pulses lie in a line, each time the second rotating body 21 rotates and hence each of the two first tooth portions 21A or the second tooth portion 21B approaches the second pickup 22. The pulse train signal, inputted from the second pickup 22 to ECU 10 at a time when the second rotating body 21 rotates, forms a cam angle signal corresponding to the first tooth portions 21A and the second tooth portion 21B of the second rotating body 21.

Then, ECU 10 reads and analyzes the crank angle signal outputted from the crank angle signal generation unit 14 and the cam angle signal outputted from the cam angle signal generation unit 13 so as to determine which cylinder is in the compression stroke.

Subsequently, the operation at a time when in the engine stopping process, the engine restart condition is established and then the engine is restarted will be explained.

When stopping of fuel injection into the engine 1 is started through the idling stop system, the engine 1 is gradually decelerated while continuing inertial rotation caused by inertia. Then, even during the deceleration period, acceleration and deceleration of the rotation speed of the engine 1 are alternately repeated due to the change in the air pressure inside the cylinder.

Specifically, for example, in a 4-stroke engine, one cycle consists of two rotations; because in the first rotation, the air in the cylinder is compressed, force that presses the piston backward is exerted and hence the engine is decelerated; when the crank angle position exceeds the top dead center of the piston, the reaction force of the compressed air accelerates the engine. Because in the next rotation, the exhaust stroke is followed by the intake stroke, the change in the acceleration is small; however, because in a multi-cylinder engine, the respective phases of the cylinders are different from one another, while the engine gradually stops, while acceleration and deceleration thereof are regularly and alternately repeated. The difference between the phases of the cylinders is, for example, 240° and 180° in the case of a three-cylinder engine and a four-cylinder engine, respectively.

Figure 2:
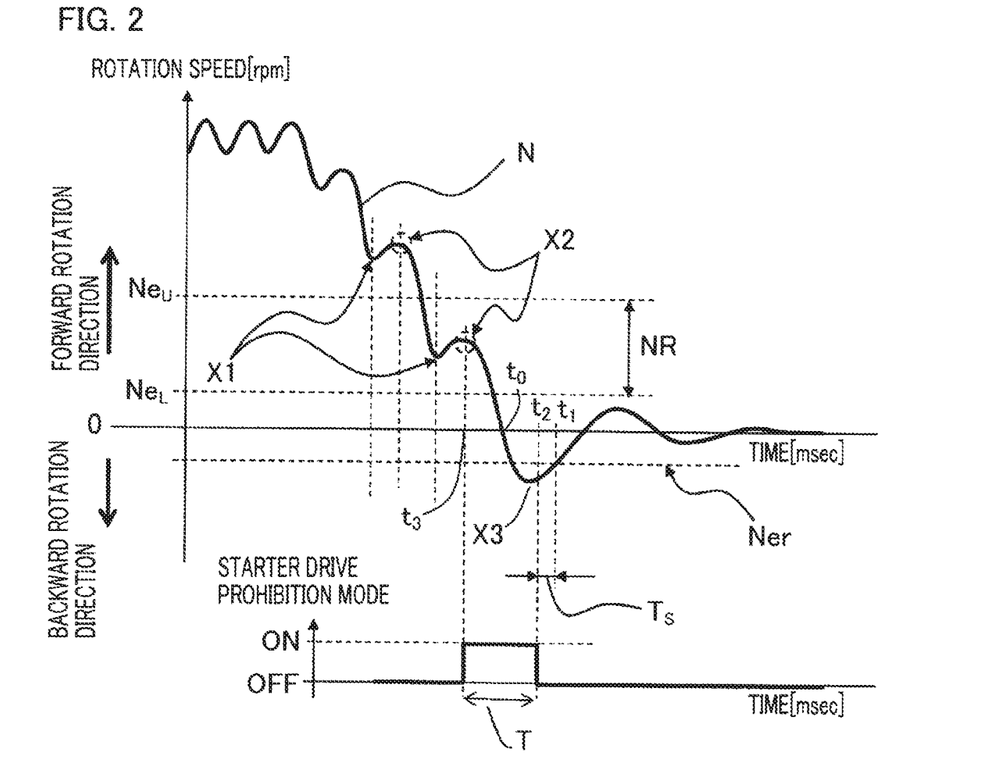
FIG. 2 is an explanatory chart for explaining the engine stopping behavior of and the starter drive control by the engine starting apparatus according to Embodiment 1 of the present invention.

FIG. 2 is an explanatory chart for explaining the engine stopping behavior of and the starter drive control by the engine starting apparatus according to Embodiment 1 of the present invention. As represented in FIG. 2, the engine rotation speed N reaches a local minimum point X1 when any one of the cylinders is at its top dead center; in contrast, the engine rotation speed N reaches a local maximum point X2 at the intermediate point between a point at which any one of the cylinders passes through its top dead center and a point at which the next-phase cylinder reaches its top dead center. In FIG. 2, only the local minimum point X1 and the local maximum points X2 and X3 are illustrated; however, the respective valley portions in the waveform of the engine rotation speed N are local minimum points at the top dead centers, and the respective summit portions thereof are local maximum points at the intermediate points between a point at which any one of the cylinders passes through its top dead center and a point at which the next-phase cylinder reaches its top dead center.

In the engine starting apparatus according to Embodiment 1 of the present invention, based on the crank angle signal outputted from the crank angle signal generation unit 14 and the cam angle signal outputted from the cam angle signal generation unit 13, ECU 10 detects the engine rotation speed N at the local maximum point at the intermediate point between a point at which any one of the cylinders passes through its top dead center and a point at which the next-phase cylinder reaches its top dead center. Because formed of an electromagnetic pickup, the foregoing first pickup 24 that outputs the crank angle signal is not capable of generating its output in a low rotation speed region, for example, at 50 [rpm], and hence cannot accurately detect the rotation speed of the engine 1; however, because in the engine starting apparatus according to Embodiment 1 of the present invention, the engine rotation speed is detected at a local maximum point that occurs in an intermediate point, the engine rotation speed N reaches the intermediate point where the local maximum point is taken, after definitely exceeding the top dead center where the local minimum point is taken and then after the engine is accelerated; therefore, there occurs no low-rotation range where the first pickup 24 formed of an electromagnetic pickup cannot generate its output. Accordingly, the first pickup 24 can accurately detect the engine rotation speed N.

Because in the vicinity of an intermediate point where the engine rotation speed N reaches a local maximum point, the fluctuation of the engine rotation speed N is small, the variations in the detection of the engine rotation speed N can be suppressed. Then, when the engine rotation speed N, at the intermediate point where the local maximum point X2 is taken, that is detected in such away as described above is within a predetermined rotation speed range NR, a starter drive prohibition mode PM is turned on during a predetermined time period T, described later. The time $T_s$ from a time point $t_2$ to a time point t1 is a time in which the starter 11 makes the pinion gear 20 move to the ring gear 12.

In the foregoing predetermined rotation speed range NR, an upper limit $Ne_U$ of the engine rotation speed N is set to an engine rotation speed for the next cylinder to definitely reach the top dead center or the vicinity thereof; in contrast, an lower limit value $Ne_L$ of the rotation speed range NR is set to be the same as or lower than an engine rotation speed at which the pinion gear 20 and the ring gear 12 safely engage with each other without causing excessive engagement noise and abrasion in the gears.

After passing through the intermediate point where the last local maximum point X2 in the forward rotation direction of the engine rotation speed N, the engine rotation speed once becomes "0"; after that, the engine rotation speed reaches the maximum value in the backward rotation direction at a local maximum point X3 in the backward rotation direction. However, due to the energy loss caused by the sliding of the piston and the friction in the bearing and the like in the interval between a time point when the engine starts to rotate in the backward direction and a time point when the rotation speed reaches the local maximum point in the backward rotation direction, the engine rotation speed N at the local maximum point X3 in the backward rotation direction becomes lower than the engine rotation speed N at the local maximum point X2 at the last intermediate point in the forward rotation direction. Accordingly, by considering the energy loss, the lower limit value $Ne_L$ of the rotation speed range NR can be lowered; thus, it is made possible to set a narrower starter drive prohibition range.

Figure 3:
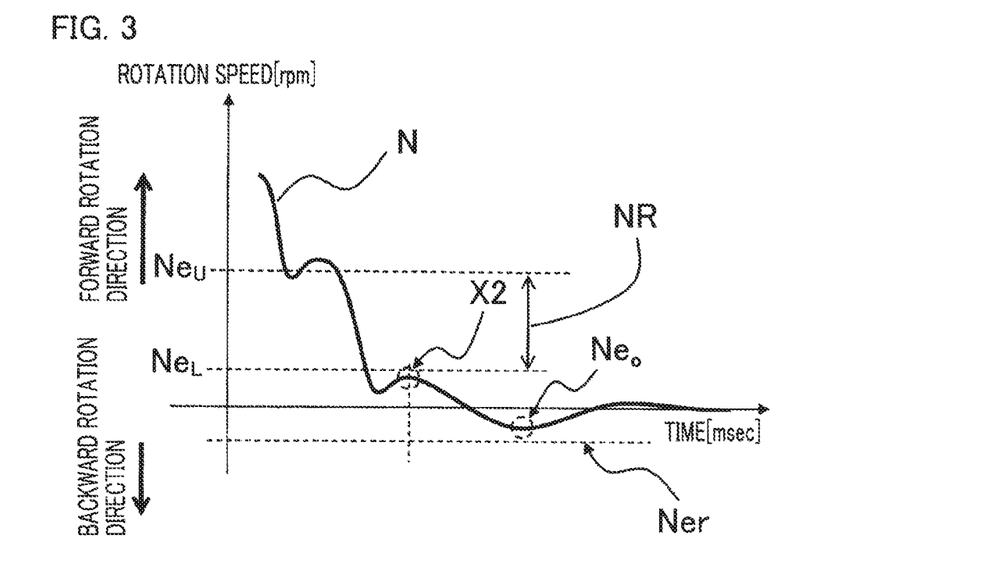
FIG. 3 is an explanatory chart for explaining the engine stopping behavior of and the starter drive control by the engine starting apparatus according to Embodiment 1 of the present invention.

FIG. 3 is an explanatory chart for explaining the engine stopping behavior of and the starter drive control by the engine starting apparatus according to Embodiment 1 of the present invention; FIG. 3 represents the case where when passing through the local maximum point X2, the engine rotation speed N is lower than the lower limit value $Ne_L$ of the predetermined rotation speed range NR. In this case, the starter drive prohibition mode is not turned on; when the condition for restarting is established, the starter is instantaneously driven so as to restart the engine. In this case, the maximal value Ne0 of the engine rotation speed in the backward rotation direction is the same as or lower than the maximum rotation speed Ner in the backward rotation direction, at which the pinion gear 20 can engage with the ring gear 12; thus, the pinion gear 20 can safely be engaged with the ring gear 12.

Figure 4:
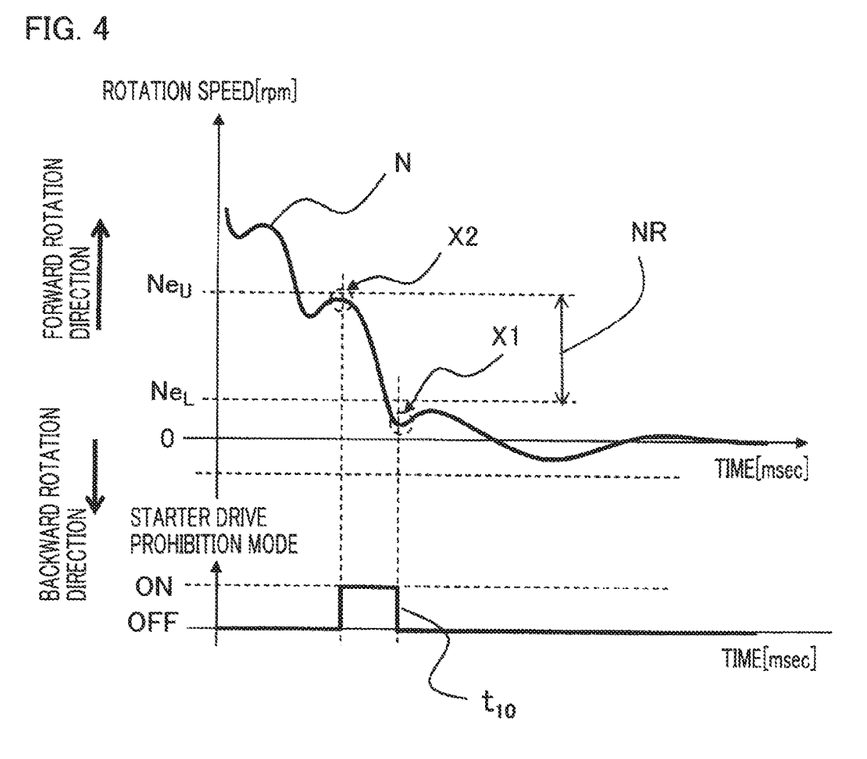
FIG. 4 is an explanatory chart for explaining the engine stopping behavior of and the starter drive control by the engine starting apparatus according to Embodiment 1 of the present invention.

FIG. 4 is an explanatory chart for explaining the engine stopping behavior of and the starter drive control by the engine starting apparatus according to Embodiment 1 of the present invention; FIG. 4 represents the case where the engine rotation speed N at the local maximum point X2 is within the predetermined rotation speed range NR and then passes through the local minimum point X1 at the top dead center of the next cylinder before the engine rotates backward. In this case, the starter drive prohibition mode is once turned on at the local maximum point X2; after that, at a time point $t_{10}$ when it is detected that the engine rotation speed N has passed through the local minimum point X1 at the top dead center, the starter drive prohibition mode is turned off again. Accordingly, when after the time point $t_{10}$ when the starter drive prohibition mode has been turned off, the condition for restarting is established, the starter is instantaneously driven so as to restart the engine. In this case, the maximal value Ne0 of the engine rotation speed in the backward rotation direction is the same as or lower than the maximum rotation speed Ner in the backward rotation direction, at which the pinion gear 20 can engage with the ring gear 12; thus, the pinion gear 20 can safely be engaged with the ring gear 12.

With reference to FIG. 2, it has been explained that when the engine rotation speed N at the intermediate point where the local maximum point X2 is taken is within a predetermined rotation speed range NR, the starter drive prohibition mode is turned on during the predetermined time period T; here, the predetermined time period T in which the starter drive prohibition mode is turned on will further be explained. Theoretically, the predetermined time period T in which the starter drive prohibition mode is turned on is a time period from a time point $t_3$ when the rotation speed of the engine 1 passes through the last local maximum point X2 in the forward rotation direction to a time point t1 when the rotation speed of the engine 1 reaches the maximum rotation speed Ner in the backward rotation direction at which the pinion gear 20 can safely be engaged with the ring gear 12. However, it is required to consider the time $T_s$ in which after a starter drive signal is inputted from ECU 10 to the starter 11, the pinion gear 20 starts to move in the axle direction to the ring gear 12 and then abuts against the ring gear 12; therefore, in practice, the time point when the predetermined time period T ends is a time point $t_2$ that is earlier by the time $T_s$ than the time point t1 when the rotation speed of the engine 1 reaches the maximum rotation speed Ner in the backward rotation direction at which the pinion gear 20 can safely be engaged with the ring gear 12. In this situation, the time t2 is a time point when the engine rotation speed N has slightly passed through the local maximum point X3 in the backward rotation direction.

By, as described above, setting the predetermined time period T to a time from the time point $t_3$ when the engine 1 passes through the last local maximum point X2 in the forward rotation direction to the time point t2, the starter is driven after the time point t2; then, at the time point t1 that is the time $T_s$ after the time when the drive of the starter has been started, the pinion gear 20 can safely be engaged with the ring gear 12.

In this situation, the time in which after passing through the last local maximum point X2 in the forward rotation direction, the rotation speed of the engine 1 once becomes "0", the engine 1 starts to rotate backward, and then the rotation speed reaches the maximum value in the backward direction or the time in which the rotation speed is further decreased and then reaches the maximum rotation speed Ner at which the pinion gear 20 can safely engage with the ring gear 12 is approximately determined from the basic specifications such as the number of cylinders of the engine 1, the volume of the cylinder, the friction in each of the units, i.e., the foregoing time can preliminarily be known. Thus, in Embodiment 1 of the present invention, for an rotation speed at which the engine rotation speed N reaches the last local maximum point X2 in the forward rotation direction, the predetermined time period is determined as represented in [Table 1] below.

TABLE 1

| ENGINE ROTATION SPEED AT INTERMEDIATE POINT [rpm] | PREDETERMINED TIME PERIOD [msec] |
|---|---|
| $Ne_U \geq Ne > Ne_1$ | $T_0$ |
| $Ne_1 \geq Ne > Ne_2$ | $T_1$ |
| $Ne_2 \geq Ne > Ne_3$ | $T_2$ |
| . | . |
| . | . |
| . | . |
| $Ne_{n-1} \geq Ne > Ne_n$ | $T_{n-1}$ |
| $Ne_n \geq Ne > Ne_L$ | $T_n$ |

That is to say, the predetermined rotation speed range NR between the upper limit value $Ne_U$ and the lower limit value $Ne_1$, represented in FIG. 2 is divided into n regions listed below.

The first rotation speed region $[Ne_U \sim Ne_1]$
The second rotation speed region $[Ne_1 \sim Ne_2]$
The third rotation speed region $[Ne_2 \sim Ne_3]$
The (N−1)th rotation speed region $[Ne_{(n-1)} \sim Ne_n]$
The Nth rotation speed region $[Ne_n \sim Ne_L]$ Then, letting Ne denote the engine rotation speed at which the engine rotation speed N reaches the last local maximum point X2 in the forward rotation direction, the predetermined time period T is set to $T_0, T_1, T_2, \ldots T_{n-1}, T_n$, as represented in Table 1, depending on in which rotation speed region among 1st rotation speed region through Nth rotation speed region the engine rotation speed Ne is included.

Here, as described above, each of the predetermined time periods $T_0, T_1, T_2, \ldots T_{n-1}, T_n$ corresponding to the engine rotation speed Ne is set to a time period from the time point $t_3$ when the rotation speed of the engine 1 passes through the last local maximum point X2 in the forward rotation direction to the time point $t_2$ when the engine rotation speed N slightly passes over the local maximum point X3 in the backward rotation direction.

Figure 5:
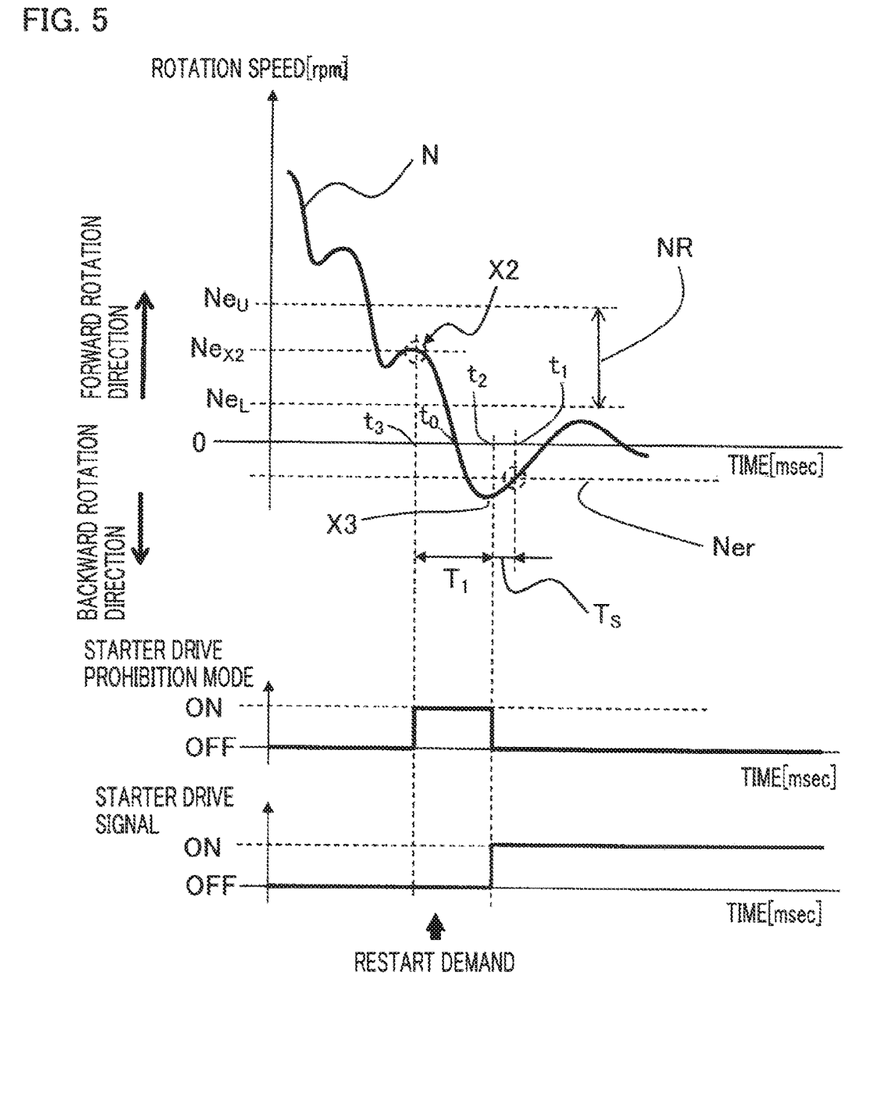
FIG. 5 is an explanatory chart for explaining the starter drive control, in an engine stopping process, by the engine starting apparatus according to Embodiment 1 of the present invention.

FIG. 5 is an explanatory chart for explaining the starter drive control, in an engine stopping process, by the engine starting apparatus according to Embodiment 1 of the present invention; FIG. 5 represents the examples for the starter drive prohibition mode and the starter drive signal. That is to say, in FIG. 5, because the engine rotation speed $Ne_{x2}$ at the local maximum point X2 at the time point $t_3$, i.e., at the last intermediate point in the forward rotation direction of the engine 1 is within the predetermined rotation speed range NR, the starter drive prohibition mode is turned on. In this situation, when the engine rotation speed $Ne_{x2}$ is included in the second rotation speed region $[Ne_1 \sim Ne_2]$ in the foregoing [Table 1], the predetermined time period T becomes $T_1$; thus, the starter drive prohibition mode is maintained until the predetermined time period $T_1$ ends. Even when during the predetermined time period $T_1$ of the starter drive prohibition mode, the condition for restarting the engine is established and a restart demand is issued, the starter drive signal is turned on at the time point $t_2$ when the predetermined time period $T_1$ ends. As a result, at the time point t1 when the rotation speed of the engine 1 reaches the maximum rotation speed Ner at which the pinion gear 20 can safely be engaged with the ring gear 12, it is made possible to make the pinion gear 20 safely engage with the ring gear 12.

As described above, in the case where the engine rotation speed $Ne_{x2}$ at the local maximum point X2 at the time point $t_3$ when the rotation speed of the engine 1 reaches the last intermediate point in the forward rotation direction is within the predetermined rotation speed range NR, the predetermined time period $(T_0 \sim T_n)$ is selected depending on in which rotation speed range among the first rotation speed range $[Ne_U \sim Ne_1]$ through the Nth rotation speed range $[Ne_n \sim Ne_L]$ in [Table 1] the engine rotation speed $Ne_{x2}$ is included; then, the selected predetermined time period is adopted as the period of the starter drive prohibition mode.

The parameters for the starter drive prohibition modes in Table 1 can be obtained through motion simulation or by measuring the actual stopping characteristics of a typical engine.

The predetermined time period in Embodiment 1 is set based on the time; however, the same effect as described above can be obtained even when the predetermined time period is set based on the crank angle position BTDC[deg] before the top dead center.

In the case of the engine starting apparatus according to Embodiment 1 of the present invention, it is not required to perform a complicated calculation for estimating the engine rotation speed; thus, the load on the ECU can be reduced. Moreover, the determination is made at the intermediate point between the top dead center of any one of the cylinders and the top dead center of the next cylinder, so that there exists no low rotation speed region where the crank angle sensor cannot output the crank pulse signal; therefore, the rotation speed can accurately be detected and determined. Furthermore, the time period from a time point of determination to a time point of a backward-rotation start is short; thus, a change in the engine rotation speed, caused by a disturbance, hardly provides an effect and hence there is demonstrated an advantage, for example, that the variation is reduced. In addition, the calculation does not require many parameters for performing; thus, there is demonstrated an advantage that control is readily implemented.

Embodiment 2

Next, there will be explained an engine starting apparatus according to Embodiment 2 of the present invention. In Embodiment 1, the predetermined time period T in which the starter drive prohibition mode continues starts at the time point $t_3$ when the rotation speed reaches the local maximum point X2 at the last intermediate point in the forward rotation direction of the engine 1; therefore, even when immediately after the time point $t_3$ when the engine rotation speed passes through the last local maximum point X2 in the forward rotation direction, the restart demand is issued, the starter drive signal is not generated. However, in Embodiment 2, the starter drive signal can be generated even immediately after the engine rotation speed passes through the last local maximum point X2 in the forward rotation direction.

However, even when the starter drive signal is generated immediately after the time point $t_3$ when the engine rotation speed passes through the last local maximum point X2 in the forward rotation direction and then the time $T_s$ in which the pinion gear starts to move and abuts against the ring gear elapses, there exists possibility that the engine rotation speed does not reach the rotation speed at which the engine rotates in the backward direction and the pinion gear safely engage with the ring gear without causing excessive engagement noise and abrasion in the gears.

Accordingly, in the engine starting apparatus according to Embodiment 2 of the present invention, the first and second predetermined periods represented in [Table 2] replacing [Table 1] in Embodiment 1 are set; when the rotation speed at the time point $t_3$ when the engine rotation speed reaches the local maximum point X2 at the last intermediate point in the forward rotation direction is within the predetermined rotation speed range NR, the first predetermined time period and the second predetermined time period are made to start at the same time; at the time point when the first predetermined time period has elapsed, the starter drive prohibition mode is turned on, and at the time point when the second predetermined time period has elapsed, the starter drive prohibition mode is turned off. The first predetermined time period is set to be shorter than the second predetermined time period.

Figure 6A:
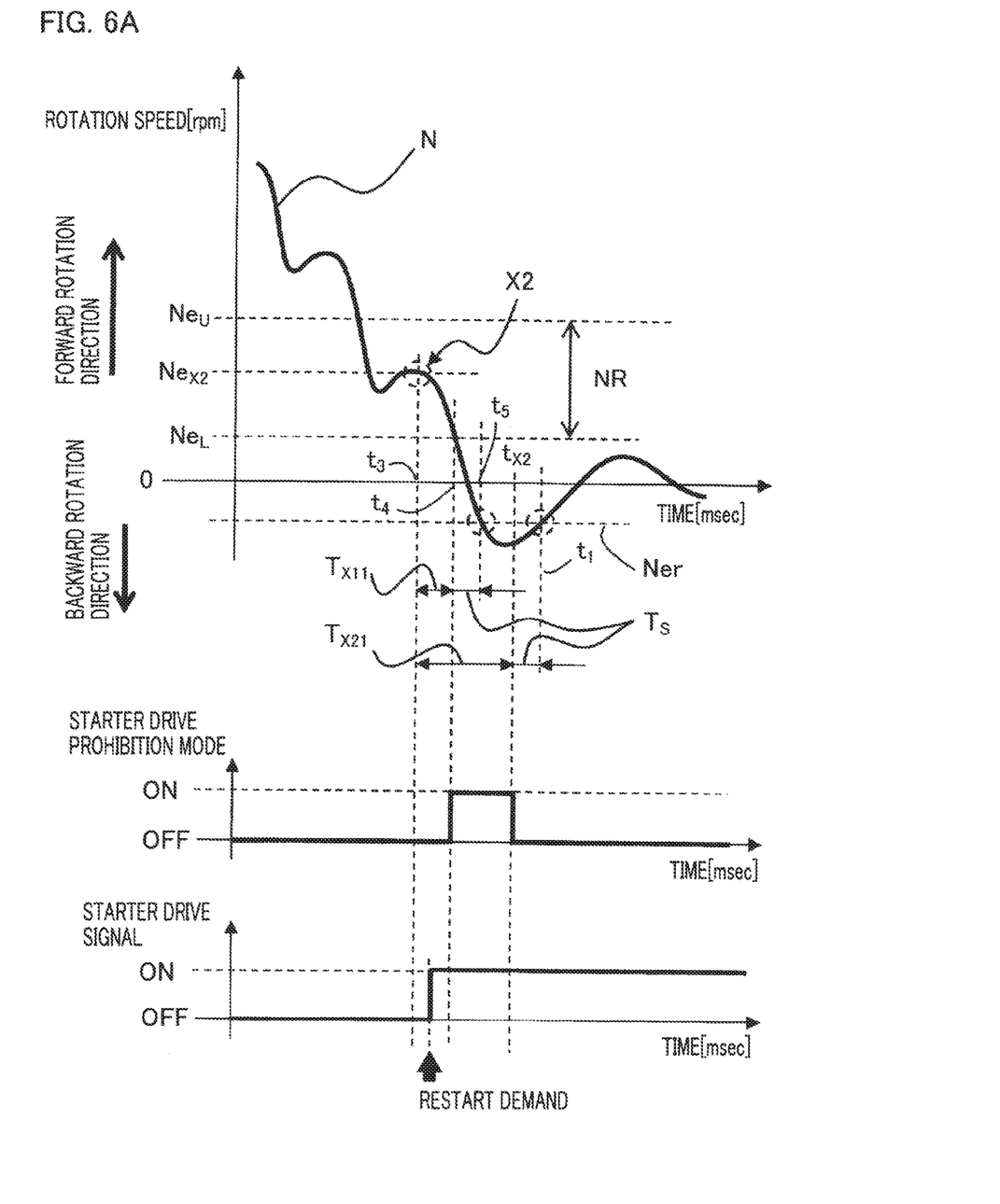
FIG. 6A is an explanatory chart for explaining the starter drive control, in an engine stopping process, by an engine starting apparatus according to Embodiment 2 of the present invention.
Figure 6B:
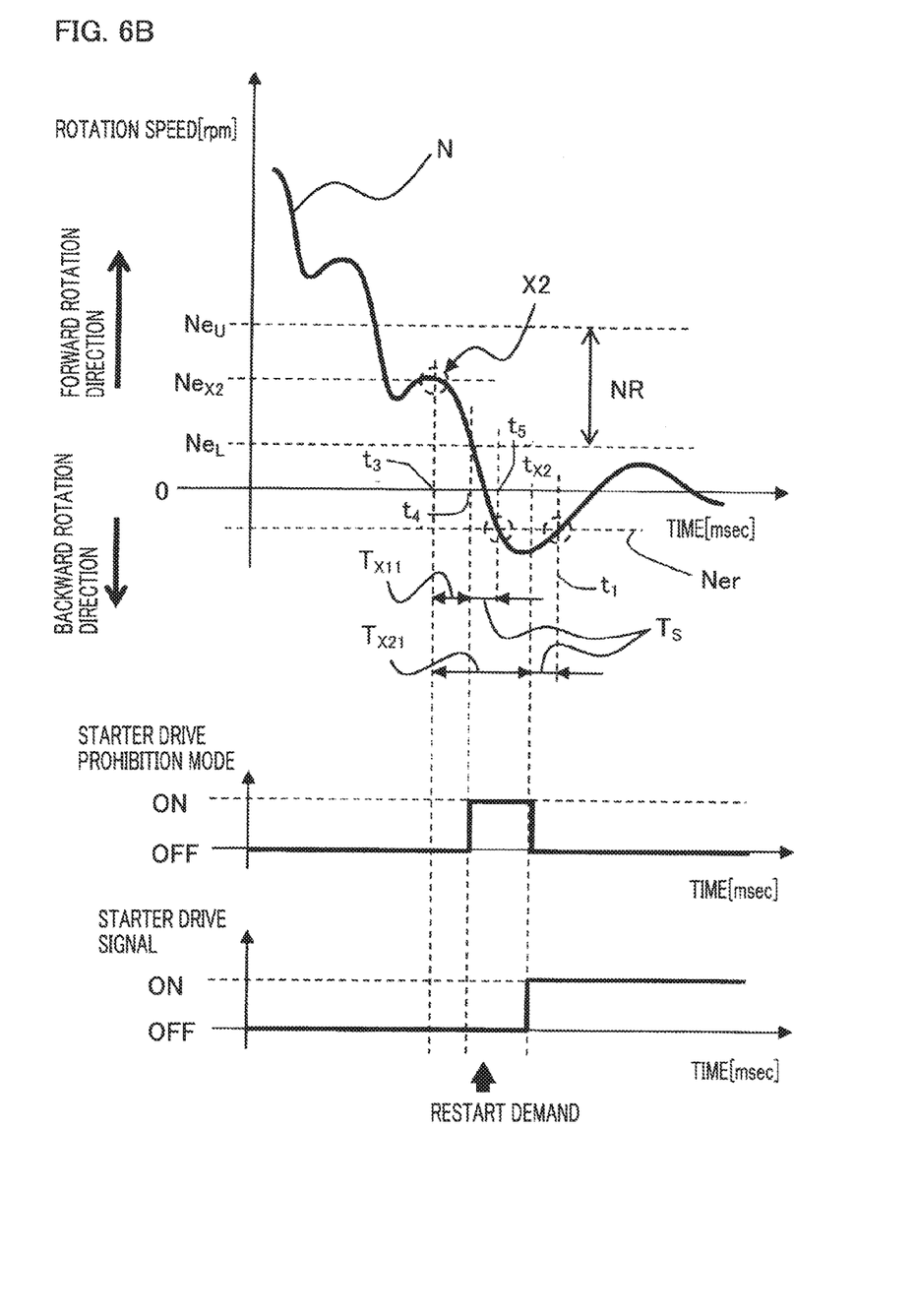
FIG. 6B is an explanatory chart for explaining the starter drive control, in an engine stopping process, by the engine starting apparatus according to Embodiment 2 of the present invention.

FIG. 6A is an explanatory chart for explaining the starter drive control, in an engine stopping process, by the engine starting apparatus according to Embodiment 2 of the present invention; FIG. 6A represents the case where the engine restart demand is issued before the first predetermined time period $T_{x11}$ elapsed. FIG. 6B is an explanatory chart for explaining the starter drive control, in an engine stopping process, by the engine starting apparatus according to Embodiment 2 of the present invention; FIG. 6B represents the case where the engine restart demand is issued after the first predetermined time period $T_{x11}$ has elapsed.

In each of FIGS. 6A and 6B, after passing through several local minimum points and local maximum points in the forward rotation direction, the engine rotation speed N in the stopping process of the engine 1 once becomes "0"; after that, the engine 1 rotates in the backward rotation direction and the rotation speed thereof passes through a local maximum point in the backward rotation direction; then, the engine 1 rotates in the forward rotation direction again. When the engine rotation speed N reaches the engine rotation speed $Ne_{x2}$ at the time point $t_3$ at which the engine rotation speed N reaches the last local maximum point X2 in the forward rotation direction, the first predetermined time period $T_{x11}$ and the second predetermined time period $T_{x21}$ start at the same time. It is assumed that the engine rotation speed $Ne_{x2}$ at the local maximum point X2 is within the predetermined rotation speed range NR.

The first predetermined time period $T_{x11}$ ends at the time point $t_4$ at which the engine rotation speed N that has been "0" reaches the lower limit value $Ne_L$ of the predetermined rotation speed range NR. In contrast, the second predetermined time period $T_{x21}$ ends at the time point $t_{x2}$ immediately after a time point at which the engine rotation speed N reaches the local maximum point in the backward rotation direction. The starter drive prohibition mode is turned on at the time point $t_4$ when the first predetermined time period $T_{x11}$ ends; the starter drive prohibition mode is turned off at the time point $t_{x2}$ when the second predetermined time period $T_{x21}$ ends.

In this situation, assuming that as represented in FIG. 6A, the engine restart demand is issued at a time point between the time point $t_3$ at which the engine rotation speed N reaches the last local maximum point X2 in the forward rotation direction and the time point $t_4$ at which the first predetermined time period $T_{x11}$ ends, the starter drive prohibition mode has not been turned on at the time point when the engine restart demand is issued; thus, the starter drive signal is immediately turned on at the time point when the restart demand is issued and hence the pinion gear 20 of the starter 11 starts to move toward the ring gear 12. When the time $T_s$ elapses after the time point when the starter drive signal is turned on, the engine rotation speed N becomes a rotation speed in the backward rotation direction after passing through "0"; after that, before the time point $t_5$ when the rotation speed becomes the maximum rotation speed Ner in the backward rotation direction at which the pinion gear 20 can safely engage with the ring gear 12, the pinion gear 20 safely engages with the ring gear 12 and hence the engine is restarted.

FIG. 6A represents the case where the time $t_s$ starts at the time point $t_4$ when the first predetermined time period $T_{x11}$ ends and the pinion gear 20 engages with the ring gear 12 at the time point $t_5$ when the engine rotation speed reaches the maximum rotation speed Ner in the backward rotation speed at which the pinion gear 20 can safely engage with the ring gear 12; this is the case where the restart demand is issued at the time point when the first predetermined time period $T_{x11}$ ends (more correctly, immediately before the foregoing time point). Accordingly, when the engine restart demand is issued at a time point (for example, at the time point, as represented in FIG. 6A, when the restart demand is issued) that is earlier than the time point $t_4$, the time $T_s$ starts at the foregoing time point; therefore, the pinion gear 20 safely engage with the ring gear 12 at a time point that is earlier than the time point $t_5$ represented in FIG. 6A.

Next, assuming that as represented in FIG. 6B, in the case where the first predetermined time period $T_m$ and the second predetermined time period $T_{x21}$ are set (as is the case with FIG. 6A) and a predetermined time period of the starter drive prohibition mode is set in a time period between the time point $t_4$ and the time point $t_{x2}$ (as is the case with FIG. 6A), the engine restart demand is issued during the predetermined time period of the starter drive prohibition mode, the starter drive prohibition mode has been turned on at the time point when the restart demand is issued; thus, the starter drive signal is turned on after the time point $t_{x2}$ when the second predetermined time period $T_{x21}$ ends and hence the pinion gear 20 starts to move toward the ring gear 12. Then, when the time $T_s$ elapses after the time point when the starter drive signal is turned on, the pinion gear 20 safely engages with the ring gear 12 before the time point $t_1$, and hence the engine is restarted. The time point t1 is a time point when the engine rotation speed N becomes the maximum rotation speed Ner in the backward rotation direction at which the pinion gear 20 can safely engage with the ring gear 12.

In Embodiment 2 of the present invention, for an engine rotation speed at which the engine rotation speed N reaches the last local maximum point X2 in the forward rotation direction, the first and second predetermined time periods are determined as represented in [Table 2] below.

TABLE 2

| ENGINE ROTATION SPEED AT INTERMEDIATE POINT [rpm] | 1ST PREDETERMINED TIME PERIOD [msec] | 2ND PREDETERMINED TIME PERIOD [msec] |
|---|---|---|
| $Ne_U \geq Ne > Ne_1$ | $T_{01}$ | $T_{02}$ |
| $Ne_1 \geq Ne > Ne_2$ | $T_{11}$ | $T_{12}$ |
| $Ne_2 \geq Ne > Ne_3$ | $T_{21}$ | $T_{22}$ |
| . | . | . |
| . | . | . |
| . | . | . |
| $Ne_{n-1} \geq Ne > Ne_n$ | $T_{(n-1)1}$ | $T_{(n-1)2}$ |
| $Ne_n \geq Ne > Ne_L$ | $T_{n1}$ | $T_{n2}$ |

That is to say, the predetermined rotation speed range NR between the upper limit value $Ne_U$ and the lower limit value $Ne_L$ represented in each of FIGS. 6A and 6B is divided into n regions listed below.

The first rotation speed region [$Ne_U$~$Ne_1$]
The second rotation speed region [$Ne_1$~$Ne_2$]
The third rotation speed region [$Ne_2$~$Ne_3$]
The (N−1)th rotation speed region [$Ne_{(n-1)}$~$Ne_n$]
The Nth rotation speed region [$Ne_n$~$Ne_L$]

Then, letting Ne denote the rotation speed at which the engine rotation speed N reaches the last local maximum point X2 in the forward rotation direction, the first predetermined time period T is set to $T_{01}, T_{11}, T_{21}, \ldots T_{(n-1)1}, T_{n1}$, as represented in Table 2, depending on in which rotation speed region among the first rotation speed region through the Nth rotation speed region the engine rotation speed Ne is included. The second predetermined time period T is set to $T_{02}, T_{12}, T_{22}, \ldots T_{(n-1)2}, T_{n2}$, as represented in Table 2, depending on in which rotation speed region among the first rotation speed region through the Nth rotation speed region the engine rotation speed Ne is included.

Here, as described above, each of the predetermined time periods $T_{01}, T_{11}, T_{21}, \ldots T_{(n-1)1}, T_{n1}$ corresponding to the engine rotation speed Ne is set to a time period from the time point $t_3$ when the rotation speed of the engine 1 passes through the last local maximum point X2 in the forward rotation direction to the time point $t_4$; each of the second predetermined time periods $T_{02}, T_{12}, T_{22}, \ldots T_{(n-1)2}, T_{n2}$ is set to a time period from the time point $t_3$ when the rotation speed of the engine 1 passes through the last local maximum point X2 in the forward rotation direction to the time point $t_{x2}$ when the engine rotation speed N slightly passes over the local maximum point in the backward rotation direction.

In Embodiment 2, the first and second predetermined time periods are set based on the time; however, as represented in [Table 3] below, the same effect as described above can be obtained even when the predetermined time periods are set based on the crank angle position BTDC[deg] before the top dead center.

TABLE 3

| ENGINE ROTATION SPEED AT INTERMEDIATE POINT [rpm] | 1ST PREDETERMINED TIME PERIOD (BTDC [deg]) | 2ND PREDETERMINED TIME PERIOD (BTDC [deg]) |
|---|---|---|
| $Ne_U \geq Ne > Ne_1$ | $\theta_{01}$ | $\theta_{02}$ |
| $Ne_1 \geq Ne > Ne_2$ | $\theta_{11}$ | $\theta_{12}$ |
| $Ne_2 \geq Ne > Ne_3$ | $\theta_{21}$ | $\theta_{22}$ |
| . | . | . |
| . | . | . |
| . | . | . |
| $Ne_{n-1} \geq Ne > Ne_n$ | $\theta_{(n-1)1}$ | $\theta_{(n-1)2}$ |
| $Ne_n \geq Ne > Ne_L$ | $\theta_{n1}$ | $\theta_{n2}$ |

In the case of the engine starting apparatus according to Embodiment 2 of the present invention, it is not required to perform a complicated calculation for estimating the engine rotation speed; thus, the load on the ECU can be reduced. Moreover, the determination is made at the intermediate point between the top dead center of any one of the cylinders and the top dead center of the next cylinder, so that there exists no low rotation speed region where the crank angle sensor cannot output the crank pulse signal; therefore, the rotation speed can accurately be detected and determined. Furthermore, the time period from a time point of determination to a time point of a backward-rotation start is short; thus, a change in the engine rotation speed, caused by a disturbance, hardly provides an effect and hence there is demonstrated an advantage that the variation is reduced. Moreover, because the time in which the drive of the starter is prohibited is shortened, the feeling of being sluggish, caused by restarting, can be suppressed. In addition, the calculation does not require many parameters; thus, there is demonstrated an advantage that control is readily implemented.

The engine starting apparatus according to Embodiment 1 of the present invention, described above, is the reduction to practice of (1), (2), and (3) out of the inventions listed in (1) through (4). The engine starting apparatus according to Embodiment 2 of the present invention, described above, is the reduction to practice of (1) and (4) out of the inventions listed in (1) through (4).

(1) An engine starting apparatus that is provided with an idling stop system for automatically stopping combustion in an engine with a plurality of cylinders so as to stop the engine, when a predetermined condition is established, and that restarts the engine by driving a starter so as to make a pinion gear provided in the starter engage with a ring gear of the engine in an inertial rotation, in the case where when combustion of the engine is stopped by the idling stop system and hence the engine is in the inertial rotation, a restart demand for the engine is issued, wherein an engine rotation speed and a crank angle position at a time when the engine is in the inertial rotation are detected, and wherein in the case where when the detected crank angle position is at an intermediate point between the top dead center of any one of the cylinders of the engine in the inertial rotation and the top dead center of the cylinder following said one of the cylinders, it is determined that the detected engine rotation speed is within a predetermined range, drive of the starter is prohibited for a predetermined time period.

2. The engine starting apparatus according to (1), wherein in the case where when the restart demand is issued before the predetermined time period elapses, the piston of the following cylinder passes through the top dead center, prohibition of the drive of the starter is cancelled.

2. The engine starting apparatus according to any one of (1) and (2), wherein the predetermined time period is determined based on the engine rotation speed at a time point when the determination is performed, and wherein the predetermined time period starts at the time point when the determination is performed.

(4) An engine starting apparatus that is provided with an idling stop system for automatically stopping combustion in an engine with a plurality of cylinders so as to stop the engine, when a predetermined condition is established, and that restarts the engine by driving a starter so as to make a pinion gear provided in the starter engage with a ring gear of the engine in an inertial rotation, in the case where when combustion of the engine is stopped by the idling stop system and hence the engine is in the inertial rotation, a restart demand for the engine is issued, wherein an engine rotation speed and a crank angle position at a time when the engine is in the inertial rotation are detected, wherein there are provided a first predetermined time period and a second predetermined time period that each start in the case where when the detected crank angle position is at an intermediate point between the top dead center of any one of the cylinders of the engine in the inertial rotation and the top dead center of the cylinder following said one of the cylinders, it is determined that the detected engine rotation speed is within a predetermined range, wherein each of the first predetermined time period and the second predetermined time period is determined based on the engine rotation speed at the time point when the determination is performed, wherein the second predetermined time period is set to be longer than the first predetermined time period, and wherein drive of the starter is prohibited for a time period from a time point when the first predetermined time period ends to a time point when the second predetermined time period ends.

INDUSTRIAL APPLICABILITY

The present invention can be utilized in an engine starting apparatus to be mounted in a vehicle such as an automobile or in the field related to production of a vehicle such as an automobile.

The invention claimed is:

1. An engine starting apparatus that is provided with an idling stop system for automatically stopping combustion in an engine with a plurality of cylinders so as to stop the engine, when a predetermined condition is established, and that restarts the engine by driving a starter so as to make a pinion gear provided in the starter engage with a ring gear of the engine in an inertial rotation, in the case where when combustion of the engine is stopped by the idling stop system and hence the engine is in the inertial rotation, a restart demand for the engine is issued, wherein an engine rotation speed and a crank angle position at a time when the engine is in the inertial rotation are detected, and wherein in the case where when the detected crank angle position is at an intermediate point between the top dead center of any one of the cylinders of the engine in the inertial rotation and the top dead center of the cylinder following said one of the cylinders, it is determined that the detected engine rotation speed is within a predetermined range, drive of the starter is prohibited for a predetermined time period.

2. The engine starting apparatus according to claim 1, wherein in the case where when the restart demand is issued before the predetermined time period elapses, the piston of the following cylinder passes through the top dead center, prohibition of the drive of the starter is cancelled.

3. The engine starting apparatus according to claim 1, wherein the predetermined time period is determined based on the engine rotation speed at a time point when the determination is performed, and wherein the predetermined time period starts at the time point when the determination is performed.

4. An engine starting apparatus that is provided with an idling stop system for automatically stopping combustion in an engine with a plurality of cylinders so as to stop the engine, when a predetermined condition is established, and that restarts the engine by driving a starter so as to make a pinion gear provided in the starter engage with a ring gear of the engine in an inertial rotation, in the case where when combustion of the engine is stopped by the idling stop system and hence the engine is in the inertial rotation, a restart demand for the engine is issued, wherein an engine rotation speed and a crank angle position at a time when the engine is in the inertial rotation are detected, wherein there are provided a first predetermined time period and a second predetermined time period that each start in the case where when the detected crank angle position is at an intermediate point between the top dead center of any one of the cylinders of the engine in the inertial rotation and the top dead center of the cylinder following said one of the cylinders, it is determined that the detected engine rotation speed is within a predetermined range, wherein each of the first predetermined time period and the second predetermined time period is determined based on the engine rotation speed at the time point when the determination is performed, wherein the second predetermined time period is set to be longer than the first predetermined time period, and wherein drive of the starter is prohibited for a time period from a time point when the first predetermined time period ends to a time point when the second predetermined time period ends.

* * * * *